United States Patent [19]
Hack

[11] 3,932,053
[45] Jan. 13, 1976

[54] METHOD FOR CONTROLLING THE WEIGHT CORRECTION OF WORKPIECES PRIOR TO FINISH-MACHINING

[75] Inventor: Heinrich Hack, Spachbruecken, Germany

[73] Assignee: Firma Carl Schenck AG, Darmstadt, Germany

[22] Filed: Sept. 3, 1974

[21] Appl. No.: 502,870

Related U.S. Application Data

[63] Continuation-in-part of Ser. No. 342,780, March 19, 1973, Pat. No. 3,847,055.

[30] Foreign Application Priority Data

Apr. 19, 1972 Germany.............................. 2218904

[52] U.S. Cl. ........................ 408/1; 29/1 D; 29/407; 29/558; 90/11 C; 408/2; 408/12
[51] Int. Cl.² ......................................... B23D 81/00
[58] Field of Search .......... 90/11 R, 11 C, 14, 13 C; 408/2, 12, 1; 29/1 D, 558, 407; 51/165.91; 73/66

[56] References Cited
UNITED STATES PATENTS

| | | | |
|---|---|---|---|
| 3,529,510 | 9/1970 | Albright | 90/11 R X |
| 3,740,161 | 6/1973 | Milewski | 408/12 |

*Primary Examiner*—J. M. Meister
*Attorney, Agent, or Firm*—W. G. Fasse; W. W. Roberts

[57] ABSTRACT

In the weight correction of workpieces prior to finish-machining, such as connecting rods, the dimensions of the pre-machined surfaces are measured and employed as a factor in the adjustment of the machine tool for weight correction of the workpieces, for example, by machining material off or adding material onto the workpiece, so that the workpiece will have the desired weight characteristics after final machining.

5 Claims, 1 Drawing Figure

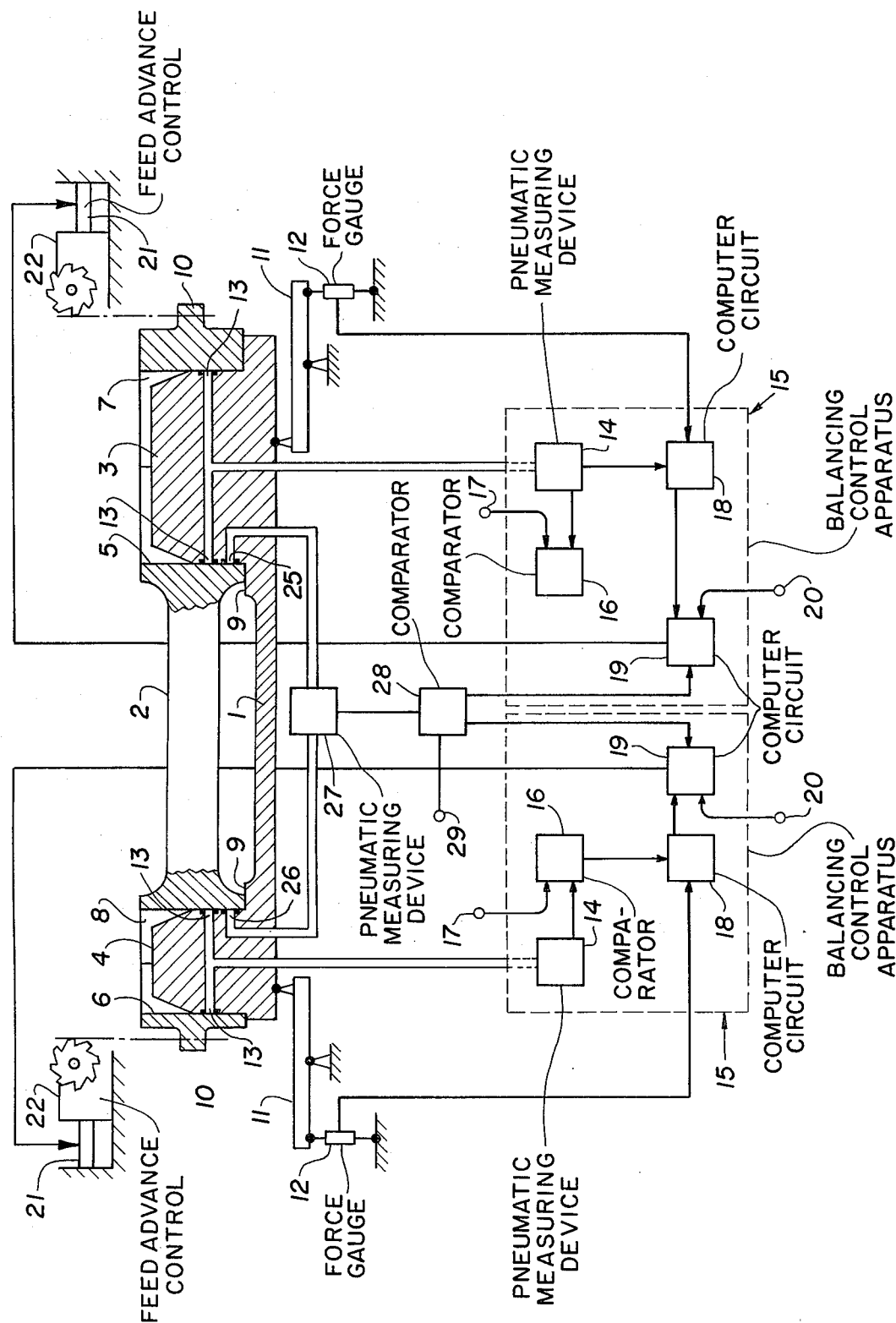

METHOD FOR CONTROLLING THE WEIGHT CORRECTION OF WORKPIECES PRIOR TO FINISH-MACHINING

BACKGROUND OF THE INVENTION

This application is a continuation in part of copending application Ser. No. 342,780 filed Mar. 19, 1973, now U.S. Pat. No. 3,847,055.

The present invention relates to a method for the weight correction of workpieces, not yet finish-machined, by removing material therefrom to obtain a desired weight. The invention is particularly adaptable to the weight correction of connecting rods, for example, automotive connecting rods, which have small and big end bores prebored with a machining or stock allowance to permit final machining. In such application, the final machining is accomplished by removing material off a boss provided at each end of the workpiece for this purpose. It will be apparent, of course, that the invention alternatively may be employed in the weight correction of other workpieces.

The weight correction or end-to-end balancing of connecting rods and similar workpieces is usually accomplished by removing material off bosses or lugs which are provided expressly for this purpose. The bores in the big and small end of connecting rods for combustion engines are generally subjected to a preliminary machining prior to the weight correction, since deformations may occur in the workpiece during the removal due to the clamping of the connecting rod. Thus, the final machining of the end bores is usually done only after weight correction.

For reasons of economy, the preliminary machining is not done with as great a production precision as the final machining. Accordingly, larger tolerances are permitted for the end bores in their preliminary machined state. Within the range of these permissible tolerances there are possible weight variations which may result in weight deviations in the final machining. In the past these weight deviations have not been taken into account in the preceding weight correction operation.

OBJECTS OF THE INVENTION

In view of the foregoing, it is the aim of the invention to achieve the following objects singly or in combination:

to provide a method of the mentioned type for performing said correction by which in spite of a large tolerance permissible for the preliminary machining a substantially complete weight correction may be accomplished prior to the final machining in such a manner that the finished workpiece will maintain a given rated weight value and weight distribution with high precision; difference to provide a method particularly adaptable to the weight correction of connecting rods, e.g. piston rods which have been subjected to preliminary machining, whereby the weight of the material which will be removed in the final machining operation is taken into consideration regardless of the tolerances of the preliminary machining; and to provide a method for the weight correction of connecting rods and the like which have been subjected to preliminary machining, wherein the weight of material which will be removed in the final machining is determined as a function of the diameters and axial spacing of the bores of the preliminarily machined connecting rod.

SUMMARY OF THE INVENTION

In accordance with the invention the above objects are achieved by measuring the dimensions of the surface of a not yet finished workpiece and comparing these dimensions with a given finished dimension. The dimensional difference determined in this manner is supplied to the material removal apparatus in order to control the latter so that more or less material is removed than that required to obtain the desired finished weight. Variations within the range of tolerance of the preliminary machining thus do not have any influence on the weight of the finished workpiece. If it is ascertained by measuring of the preliminarily machined workpiece surfaces that a large machining allowance has remained, correspondingly less material will be removed during the weight correction in order to take into account that a relatively larger quantity of material will be removed during the following finish-machining.

In accordance with a further embodiment of the invention for the weight correction of connecting rods, the diameters of the two preliminarily machined end bores are measured to ascertain the difference between the predetermined finished dimension of the bores and the just mentioned preliminary diameter. The difference value is employed for controlling the feed advance movement of the machining means for machining the boss at each piston rod end bore. In this case the balancing is accomplished separately for each piston rod end bore so that also the feed control of the machining means is controlled separately for each end bore in response to the preliminary machining dimension of the respective end bore.

According to a still further embodiment of the invention, the spacing of the axes of the preliminarily machined end bores is measured and compared with a given distance whereby the resulting difference between the preliminary and given dimension is used as an additional control value for the feed advance movement of the machining means for machining the boss at each end of the rod.

The apparatus of my above mentioned co-pending application is suitable for performing the present method. Briefly, such apparatus comprises a scale for weighing the connecting rod at both ends. A control device for the weight correction is provided which comprises a computer circuit for transforming the difference between the actual measured value and the rated value of the weight of the connecting rod into a distance information for the feed advance of the machining means for the machining or removing of the material from the boss at each end of the rod. The scale for weighing the connecting rod comprises a separate pneumatically operated diameter measuring device for each of the two end bores. The control device for the weight correction includes a comparator circuit for comparing the diameter measuring results with the given rated diameters, and the comparator supplies the diameter difference to a computer circuit. The computer circuit subtracts the weight difference resulting from the diameter difference from the measured weight of the respective end. The information regarding the diameter of the end bore is converted into a distance information signal for controlling the machining device, so that the weighing result and the given rated value for final machining and for the final weight are taken into account.

The scale may be provided with separate adapter pins for the end bores; the pins also functioning as the plug gauges of the pneumatic measuring device. For this purpose, the pins may be provided with radially directed measuring nozzles. This feature greatly simplifies the practice of the present method since the weighing step and the measuring of the diameter of the bore are simultaneously effected on the same apparatus. In case it is desired to take the spacing of the axes of the preliminarily machined bores into account, in a further embodiment of the invention, the adapter pins are provided with additional measuring nozzles for ascertaining the spacing of the axes of the preliminarily machined end bores, so that this measurement also does not require any additional operational step.

BRIEF FIGURE DESCRIPTION

In order that the invention may be clearly understood, it will now be described, by way of example, with reference to the accompanying drawings, wherein the single FIGURE is a simplified illustration of a device for supporting and measuring a connecting rod, the apparatus for measuring the bore diameter and for controlling the feed advance of the machining apparatus which performs the weight correction being represented schematically in a block diagram form.

DETAILED DESCRIPTION OF EXAMPLE EMBODIMENTS

Referring now to the FIGURE, a supporting or base plate 1 for the connecting rod 2 is provided with a large adapter pin 3 and a small adapter pin 4 respectively for the big end and the small end bores 5 and 6 of a connecting rod 2 to be balanced, such as a piston rod.

The adapter pins 3 and 4 center the connecting rod 2 which has a big end bore 7 and a small end bore 8 and the rod rests on bearing surfaces 9 of the base plate 1 adjacent the respective pins.

The bosses 10 are provided on the connecting rod adjacent each of the two end bores 7 and 8 so that the weight of the connecting rod may be corrected by machining off these bosses.

The end bores 5 and 6 have been machined to an under size before the connecting rod 2 is put on the balancing device. The final machining of the bores 5 and 6 is done after the connecting rod has been balanced.

The base plate 1 is supported at both ends on separate weighing means 11 which are shown in the drawing as simple beam balances. A load transducer 12, for example, a load cell or the like is connected to one end of each balance beam to provide a signal which contains an information regarding the weight of the respective connecting rod end. The sum of the net weights measured at both ends of the connecting rod constitutes the total weight of the connecting rod. The rated weight value for each end of the connecting rods is determined separately in order to keep the total weight of the connecting rod as well as the position of the center of gravity relative to the axes of the two bores within close limits.

The adapter pins 3 and 4 are drilled to provide radially arranged nozzles 13, through which air under pressure from a source of air (not shown) is directed outwardly for measuring the diameter of the bores 5 and 6. With the aid of pneumatic measuring apparatus 14 connected to the holes in the pins the difference pressure is measured in a manner known per se, in order to measure the bore diameter. In other words, since the pressure in the holes in the pins is determined by the radial spacing between the nozzle 13 and the bores 5 and 6, the pressure applied to the devices 14 is a measure of the bore diameters.

Each pneumatic measuring device 14 forms part of a separate control device 15 for weight correction and each device also includes a comparator circuit 16 connected to compare the measured value of the bore diameter provided by the measuring device 14 with a rated diameter value of the finished bore 5 or 6, the rated value is supplied in the form of a determined signal at an input 17. The signal corresponding to the diameter different determined in this manner is supplied to a computer circuit 18, and a signal corresponding to the measured weight of the connecting rod end from the load transducer 12 is also applied to the computer circuit 18. The computer circuit 18 subtracts the signal corresponding to weight differences which result from the diameter differences from the signal corresponding to the measured weight of the respective connecting rod end bore. Thus, a corrected measured weight value signal is obtained, and this signal is supplied to a further computer circuit 19 for comparison with a rated weight value signal for the respective connecting rod end bore. The rated weight value signal is supplied to the input 20. The resulting difference signal is converted into a distance information signal for controlling the feed advance control device 21 of a machining apparatus 22. The apparatus 22 then machines the boss 10 at the respective connecting rod end until the desired weight balance is achieved, i.e. as determined by the signal applied to input 20 and the diameter of the bores.

Without the diameter measuring device 14 and the circuits 16 and 18, the material at the boss 10 would be removed only to such an extent that the connecting rod would have a predetermined weight. The next following boring or final boring operations on the bores 5 and 6 to the final dimension would thus reduce the weight of the connecting rod so that the connecting rod would have less than its rated weight. However, by measuring the bore diameter and by using the information thus ascertained in the control device 15, the boss 10 is machined only to such extent that the rated weight of the connecting rod 2 may be achieved by the finish-machining of the bores 5 and 6 to their rated diameters.

If it is desired that the weight correction also takes into consideration the variations of the spacing between the axes of the connecting rod bores 5 and 6, it is necessary to provide additional nozzles in the adapter pins 3 and 4 so that the spacing between said axes may be ascertained in a manner similar to the above described manner of ascertaining the bore diameters so that the signal representing the spacing between the axes may be employed in the control device 15 for weight correction. Thus, variations of the spacing of the axes which are possible within the range of the preliminary machining tolerance are also taken into account with regard to their influence on the final weight of the connecting rods. For example, the adapter pins 3 and 4 are drilled to provide nozzles 25 and 26 respectively, the nozzle 25 being directed toward the center of the adapter pin 4 and the nozzle pin 26 being directed toward the center of the adapter pin 3. Air under pressure from a source of air (not shown) is directed into the nozzles 25 and 26, whereby the spacings between the axes of the bores 5 and 6 may be measured by means of a pneumatic measuring device 27 connected to the nozzles 25 and 26. In other words, since the pressures in the nozzles 25 and 26 is determined by the spacings between the nozzles 25 and 26 and the respective sides of the bores 5 and 6, the pressure applied to the pneumatic measuring device 27 is a measure of the distance between the nearest edges of the bores 5 and 6, and hence of the distance between the axes of the bores. The output of the pneumatic measuring device 27 is applied to a comparator circuit 28, wherein it is compared with a rated value supplied in the form of a determined signal applied to the second input 29 of the comparator 28. The output of the comparator 28 is thus a signal corresponding to the difference between the actual and rated distances between the axes of the bores 5 and 6. This signal may be applied to the computer circuits 20 of the two balancing control apparatuses 15, so that the variations in the spacings of the axes are taken into account in the machining of the ends of the connecting rods to achieve balance.

Instead of the illustrated pneumatic measuring means, other conventional measuring means may be employed for measuring the diameters of the bores. For example, mechanical sensors may be employed, the measuring results of which may be transformed into electrical signals by conventional means. In the example shown, the weight correction is accomplished by a material removal. However, the correction may alternatively be made by selectively applying material to the test sample. In that instance, the stock allowance to be taken into consideration at the bores 5 and 6 would result in an increase of the material to be added, as compared with the known method. The material may be added, for example, by conventional welding means, not shown.

Although the invention has been described with reference to specific example embodiments, it is to be understood, that it is intended to cover all modifications and equivalents within the scope of the appended claims.

I claim:

1. In a method for correcting the weight of a connecting rod to produce a close tolerance finished weight of said rod which has a bore in each rod end, wherein a preliminary machining permitting wide tolerances and a finish operation are performed to vary the weight of the connecting rod to produce said finished weight, the improvement comprising boring said bores to a wide preliminary tolerance, weighing said connecting rod after said preliminary boring but prior to said finish operation to produce a measured weight representing signal, measuring the diameter of said preliminarily bored end bore to produce a measured bore diameter signal, comparing said measured bore diameter representing signal with a rated bore diameter signal to provide a diameter difference signal, producing a correction signal by combining said measured weight representing signal and said diameter difference signal, producing a control signal modified in response to said correction signal and performing said finish operation in response to said modified control signal whereby said finished weight is independent of any variations in said wide preliminary tolerance.

2. The method of claim 1, further comprising measuring the spacing between the axes of the preliminarily bored end bores, and varying the weight of the rod in response to the measured spacing, whereby said finished weight of said connecting rod is independent of said spacing.

3. The method of claim 2, further comprising comparing the measured spacing between the axes of preliminary bored end bores with a given dimension to produce a difference measurement signal, and varying the weight of said connecting rod in response to said last mentioned difference measurement signal, whereby the finished weight of said connecting rod is independent of said last mentioned difference measurement.

4. The method of claim 1, wherein said connecting rod has bosses of material at each end and wherein said finish operation for the weight correction comprises removing material from said bosses.

5. The method of claim 1, wherein said finish operation comprises adding material to said connecting rod.

* * * * *